(No Model.)
S. M. LOVE.
Combined Cultivator and Cotton Chopper.
No. 239,176. Patented March 22, 1881.
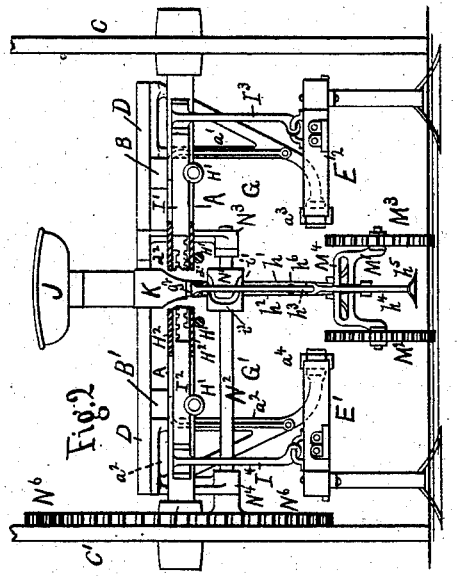
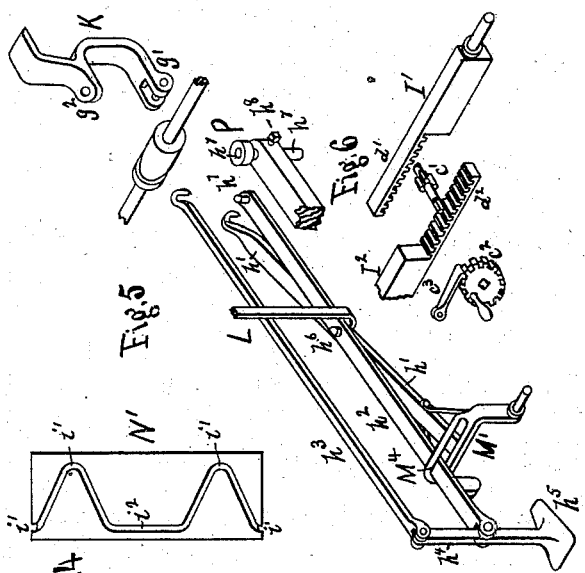
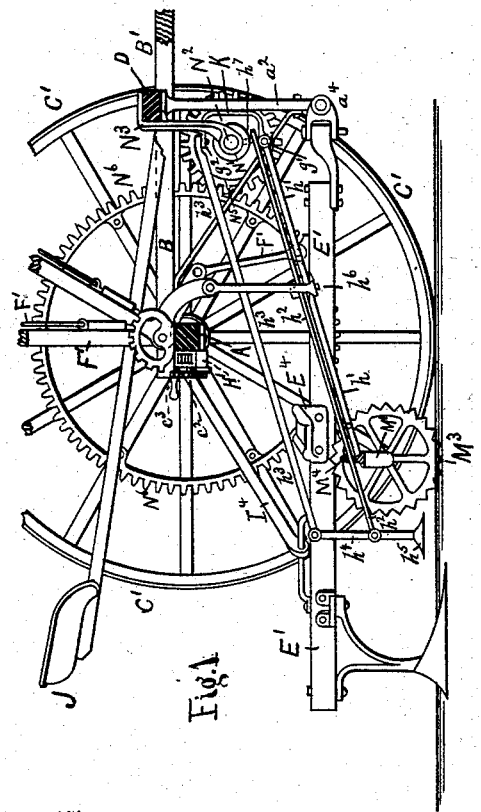
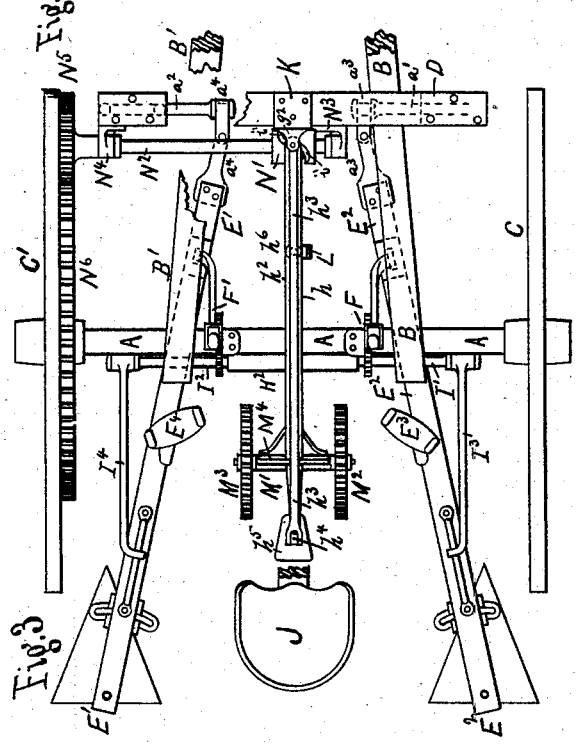
WITNESSES.
Louis Feeser Jr.
J. P. Orcutt.
Samuel Merrick Love.
INVENTOR, BY
Louis Feeser & Geo.
Atty's.
N. PETERS, PHOTO-LITHOGRAPHER, WASHINGTON, D.C.

UNITED STATES PATENT OFFICE.

SAMUEL M. LOVE, OF MINNEAPOLIS, MINNESOTA, ASSIGNOR OF ONE-HALF TO MARTIN L. LUDWIG, OF SAME PLACE.

COMBINED CULTIVATOR AND COTTON-CHOPPER.

SPECIFICATION forming part of Letters Patent No. 239,176, dated March 22, 1881.

Application filed December 22, 1880. (No model.)

*To all whom it may concern:*

Be it known that I, SAMUEL MERRICK LOVE, of Minneapolis, in the county of Hennepin and State of Minnesota, have invented certain new and useful Improvements in Combined Cultivator and Cotton-Chopper, of which the following is a specification.

This invention relates to machines for cultivating and chopping cotton; and it consists in a knife or cutter adapted to be vibrated at right angles to the rows of cotton by a cam or other device in such a manner as to cut the plants off close to the ground for any desired distance, and then be moved to one side and pass around one or more plants without cutting them, so as to leave live plants at regular intervals; and in connecting said intermittent cutter to a frame carrying two or more toothed wheels running upon the ground, whereby the cutter-frame will be held in place and made to travel parallel with the rows, and not be thrown from side to side by the vibratory action of the cutters, as hereinafter set forth.

The invention further consists in combining with said chopper a cultivator, and in the manner of arranging the adjusting apparatus of the same, as hereinafter set forth.

I accomplish these results by the use of the mechanism illustrated in the accompanying drawings, in which—

Figure 1 is a sectional side elevation. Fig. 2 is a rear elevation, and Fig. 3 is a plan view. Fig. 4 is an enlarged detached view of the cutter-operating cam; Fig. 5, a perspective view of the chopping mechanism detached; Fig. 6, a perspective view of the cultivator-adjusting mechanism detached.

A is the stationary axle; B B′, the tongue; C C′, the wheels, and D the cross-bar to which the horses are attached, and which is also utilized to support two hangers, $a'$ $a^2$, to which two cultivator-bars, E′ E², are connected by double joints $a^3$ $a^4$, so that the bars may have both a horizontal and perpendicular movement to permit their rear ends to be adjusted nearer to or farther from each other, and also be lifted up off from the ground by ratchet-levers F F′. These hangers $a'$ $a^2$ will be made with their lower points, where the joints $a^3$ $a^4$ occur, closer to each other than at the top, to form open spaces G G′, (see Fig. 2,) to allow the branches of the plants to pass through without injury while the cultivator is drawn beneath them, so that the plants may be cultivated close up to their roots without injury to the upper branches.

Resting loosely upon rollers H′ upon the rear side of the axle A is a hollow oblong box or sleeve, H², in the center of whose interior a small pinion, $c'$, is journaled, (see Fig. 6,) and provided on the outside with a toothed wheel, $c^2$, and pawl $c^3$, by which the pinion may be revolved and held at any point.

I′ I² are two bars having geared racks $d'$ $d^2$ on their inner ends adapted to mesh into opposite sides of the pinion $c'$, so that when the latter is revolved to the right or left the bars I′ I² will be moved in opposite directions and held at any desired point by the pawl $c^3$.

Pivoted upon the outer ends of the bars I′ I² are rods I³ I⁴, running backward and downward, and connected to the tops of the cultivator-bars E′ E², as shown, by which means, when the pinion $c'$ is revolved, the bars I′ I² I³ I⁴ will move the cultivator-bars nearer to or farther from each other to regulate the width of their action.

E³ E⁴ are foot-rests, so that the driver, who sits upon the seat J, may press upon either one of the bars E′ E² to force the cultivator to either side, to enable it to follow irregularities in the rows or to pass around obstructions, and also to assist in turning the corners at the ends of the rows. When the cultivator is thus moved the sleeve H² runs back and forth over the rollers H′.

Secured to the center of the cross-bar D is a hanger, K, having an arm, $g'$, at its lower end, into which a long arm, $h'$, is hooked or otherwise attached, so as to have both a horizontal and perpendicular movement, so that it is free to be raised and lowered by a ratchet-lever, L, on the axle A or moved from side to side. Secured rigidly to the lower end of this rod $h'$ is a bow-shaped frame, M′, upon whose outer ends wheels M² M³ are journaled.

$h^2$ $h^3$ are two rods parallel to each other and to the rod $h'$, and pivoted at their lower ends to an upright standard, $h^4$, some distance in the rear of the frame M′, and having a sharpedged inclined-sided cutter, $h^5$, secured to its lower end, as shown. The upper end of the rod $h^3$ is hooked into an arm, $g^2$, on the hanger K, so as to have both a horizontal and perpendicular movement, while the rod $h^2$ is pivoted to the lower rod, $h'$, at $h^6$, and has a pin, $h^7$, projecting from its upper end provided with a friction-roller, and adapted to run in a cam-groove, $i'$, in a collar, N', on a shaft, $N^2$, running through hangers $N^3$ $N^4$ on the cross-bar D, as shown, and adapted to be revolved by a pinion, $N^5$, meshing into a gear, $N^6$, on one of the wheels C C'. By this arrangement it will be seen that when the collar N' revolves its cam-groove $i'$, acting upon the pin $h^7$ and pivoted rod $h^2$, will vibrate the cutter $h^5$ rapidly from side to side. This rapid motion of the cutter has a tendency to throw the frame M' and wheels $M^2$ $M^3$ from side to side, and to counteract this I provide the rims of the wheels with teeth which sink into the ground and prevent any side motion. These teeth will not be made larger than just enough to hold the cutter $h^5$ from being thrown aside by its own motion or in cutting the tender plants; but should any larger obstructions be met with the cutter will be thrown aside, and thus prevent breakage. The hooks at $g'$ $g^2$ and the pin $h^7$ being in a line perpendicularly, and the standard $h^4$ being parallel with them, the latter will retain its upright position when the chopper is raised and lowered by the lever L, so that the cutter $h^5$ may be made to operate at any desired distance from the ground, or moved off to one side to follow crooked rows or to avoid obstructions. The cam-groove $i'$ will have a portion of its length at $i^2$ parallel with its revolution, so that when the pin $h^7$ is traveling through that distance the rod $h^2$ and cutter $h^5$ will be held stationary to one side, as hereinafter shown.

Cotton is ordinarily planted close together in equidistant rows or drills, and then when the plants come up a certain number are cut or chopped off, leaving plants at equal distances apart, usually from twenty inches to thirty-six inches, and to cut or chop off these intervening plants is the work of the cutter $h^5$, which, by providing the cam-groove $i'$ with the straight portion $i^2$, is held stationary off to one side at regular intervals long enough to be drawn by one or more plants and not cut them, and then return to its work.

By providing different sizes of the collars N', and altering the form of the cam-groove $i'$, the distance between the preserved plants may be increased or decreased, as desired.

The pin $h^7$ will be long enough to pass some distance through the rod $h^2$ and be provided with a set-screw, $h^8$, (see enlarged view at P, Fig. 5,) so that the friction-roller may be adjusted nearer to or farther from the rod to adapt it to different-sized cams N'.

I do not wish to confine myself to the form shown of the cutter $h^5$, as it may be made in many ways to accomplish the same purpose.

A small guard, $M^4$, will be arranged on the frame M' above the rod $h^2$, to hold it in place and prevent its being thrown out.

Any form or style of cultivator-teeth may be used and made adjustable to regulate their action.

Scrapers may be substituted for the cultivator-teeth under some conditions of the soil.

What I claim as new is—

1. In a cotton-chopper, the combination, with a cutter adapted to be vibrated at right angles to the rows and held stationary at one side at regular intervals, whereby a portion of the plants may be cut off and a portion left standing at equal distances apart, of a frame, M', carrying the toothed wheels $M^2$ $M^3$, the pivoted connecting-bar $h'$, and hanger K, whereby the cutter-frame is held in place and made to travel in a line parallel with the rows of cotton and not be affected by the vibrations of the cutter, as set forth.

2. The combination and arrangement of the grooved cam N' $i'$ $i^2$, rods $h'$ $h^2$ $h^3$, hanger K $g'$ $g^2$, standard $h^4$, cutter $h^5$, frame M', and wheels $M^2$ $M^3$, substantially as set forth.

3. The combination and arrangement, with the cam N' $i'$ $i^2$, rods $h'$ $h^2$ $h^3$, standard $h^4$, and cutter $h^5$, of the cultivator E' $E^2$, substantially as set forth.

4. The combination, with the cultivator-bars E' $E^2$ and axle A, of the rods $I^3$ $I^4$ and bars I' $I^2$, provided with the racks $d'$ $d^2$ and pinion $c'$, substantially as set forth.

5. The combination, with the cultivator-bars E' $E^2$, of the branched hangers $a'$ $a^2$, their lower ends curving inward to form bearings for said bars, whereby the latter may be brought up close to the roots and stalks of the plants and the branches pass through the spaces between, substantially as set forth.

In testimony whereof I have hereunto set my hand in the presence of two subscribing witnesses.

SAMUEL MERRICK LOVE.

Witnesses:
M. L. LUDWIG,
C. N. WOODWARD.